United States Patent [19]

Felicetta et al.

[11] 3,886,101

[45] May 27, 1975

[54] PHENOLIC ADHESIVES

[75] Inventors: Vincent F. Felicetta; Donald E. Wenzel, both of Bellingham, Wash.

[73] Assignee: Georgia-Pacific Corporation, Portland, Oreg.

[22] Filed: July 8, 1974

[21] Appl. No.: 486,414

[52] U.S. Cl. ............... 260/17.5; 156/335; 161/262; 260/124 R; 260/124 A; 260/124 B
[51] Int. Cl. ...... C08h 5/02; C07g 1/00; B32b 27/42
[58] Field of Search .......... 260/17.5, 124 R, 124 A, 260/124 B; 161/262; 156/335

[56] References Cited
UNITED STATES PATENTS

| | | | |
|---|---|---|---|
| 2,786,820 | 3/1957 | Uschmann | 260/17.2 |
| 2,849,314 | 8/1958 | Goss | 260/17.5 X |
| 3,076,772 | 2/1963 | Christ | 260/17.5 X |
| 3,093,604 | 6/1963 | Ayers | 260/17.5 X |
| 3,141,873 | 7/1964 | Goss | 260/124 |
| 3,149,085 | 9/1964 | Ball et al. | 260/17.5 |
| 3,167,523 | 1/1965 | Dimitri | 260/17.5 |
| 3,285,801 | 11/1966 | Sarjeant | 260/17.5 X |
| 3,296,159 | 1/1967 | Lissner | 260/17.5 |
| 3,597,375 | 8/1971 | Ludwig et al. | 260/17.5 |
| 3,658,638 | 4/1972 | Ludwig et al. | 260/17.5 X |
| 3,697,497 | 10/1972 | Falkehag | 260/124 A |

*Primary Examiner*—Morris Leibman
*Assistant Examiner*—T. De Benedictis, Sr.
*Attorney, Agent, or Firm*—Peter P. Chevis

[57] ABSTRACT

A ready-to-use phenolic adhesive for the manufacture of plywood containing a polymerized lignosulfonate is described. The lignosulfonate is polymerized with an aldehyde or an epoxide to an extent that from 30 to 80 percent of the product is insoluble in an aqueous 5 percent sodium carbonate solution.

19 Claims, No Drawings

PHENOLIC ADHESIVES

This invention relates to phenol-aldehyde compositions, more particularly to phenolic-aldehyde adhesives used especially in plywood and particle board manufacture.

Adhesives for plywood preparation must have certain working characteristics in addition to the proper adhesive properties for a satisfactory performance under modern production methods. Even though good bond strengths may be possible under certain conditions, the resin may not be suitable for plywood adhesives, if these results cannot be readily achieved under the accepted production methods. In many operations, the assembled panels of plywood or laminated wood products are prepressed cold prior to heat setting of the adhesive. By prepressing the assembled panels, the capacity of the heated platen press is increased and the quality of the plywood improved. In cold prepressing, the adhesive must have sufficient tack to permit the handling of the prepressed panels without shifting of the plys after the pressure is removed. After consolidation of the panel, it is stored or held for various lengths of time until the panel can be subjected to high temperature and pressure to finally set the adhesive. The hot-pressing operation is a more involved operation using the more costly equipment and usually is the limiting production factor in the mill. An adhesive which will permit the consolidated panel to be stored for long periods of time, for example a hold time of 16 to 40 hours before hotpressing gives considerable flexibility to the mill. The plys may be laid up on one shift and hot-pressed at a later time to increase the production from the mill.

Phenolic resins generally are not used alone as plywood adhesives. Various fillers and modifiers have to be added to the resin to control the properties and different formulations have to be used for different conditions. For example, the formulation for southern pine veneer differs from the adhesive used for Douglas Fir. The adhesives generally are formulated just prior to use because of poor stability of the adhesive when intermixed with fillers or other additives. The fillers generally have a tendency to settle or float out of the resin or the mixed adhesives thicken or thin out rapidly upon standing. The formulation of the adhesive is not only time consuming but is performed by personnel lacking sufficient chemical training to be able to make the necessary adjustments in the formulation to obtain optimum results under the variation in operating conditions normally encountered. Thus, it would be very desirable to have a phenolic plywood adhesive which could be formulated at the resin plant and made available to the mills in a form which would be used without requiring further processing at the mill. It is further desirable to have a phenolic adhesive which would be operative for different veneers and under the different conditions normally encountered without having to continually adjust the adhesive by addition or deletion of different additives or modifiers.

Lignosulfonates have adhesive characteristics to a limited extent and numerous publications teach using lignosulfonates as an adhesive or addition of lignosulfonates to adhesives, such as phenolic adhesives, as an extender or replacement for a portion of a resin constituent. In U.S. Pat. No. 2,849,314 lignosulfonate is treated with ammonia and then reacted with an aldehyde, an amide, or an hydroxy aromatic compound to obtain a thermosetting resin. U.S. Pat. Nos. 2,786,820 and 3,296,159 likewise disclose the reaction of lignosulfonate with an aldehyde in preparation of water-soluble, thermosetting adducts which may be used as an adhesive or added to phenol-formaldehyde adhesives. Using lignosulfonate to replace a portion of the phenol in preparation of phenolic adhesives is taught in U.S. Pat. Nos. 3,597,375 and 3,658,638. Different molecular weight lignosulfonates were also used as extenders in phenolic adhesives as reported by Julius Benko in Volume 44, No. 12, pages 849–854 of TAPPI (December, 1961) published by the Technical Association of Pulp and Paper Industry. While various suggestions for use of lignosulfonates have been made, most of the work has been directed toward trying to utilize the lignosulfonate as an adhesive or to use the lignosulfonate to replace a portion of the phenolic resin and not to use the lignosulfonate to impart characteristics to the phenol-aldehyde resin necessary for an adhesive for plywood application.

It is, therefore, an object of this invention to provide a ready-to-use adhesive of a mixture of phenol-aldehyde resin and lignosulfonate especially applicable for plywood manufacture. A further object is to provide an adhesive containing lignosulfonate in a particular form which imparts desired characteristics to the phenol-aldehyde resins eliminating the need of additional modifiers or fillers. A still further object is to provide a ready-to-use adhesive which may be applied by spray, roll or curtain coater and will have good shelf-life and pre-press properties and permit a long stand or assembly time before hot-pressing. A still further object is to provide an adhesive containing a lignosulfonate in a form enhancing the water-holding properties of the adhesive and resistance to excessive flow or press-out during hotpressing.

The above and other objects are attained according to this invention by the preparation of the adhesive by intermixing up to 50 percent, based upon the weight of the phenol and aldehyde, of a lignosulfonate which has been polymerized or cross-linked with an aldehyde or an epoxide until from 30 to 80 percent, preferably from 45 to 65 percent, of the polymerized lignosulfonate is insoluble in an aqueous 5 percent sodium carbonate solution. The adhesive has exceptionally good stand or assembly time properties. After prepressing or cold-pressing, the panels may be held to over 40 hours and still good hotset bonds are obtained. The polymerized lignosulfonate provides sufficient body to the adhesive to give good coldpressing and sufficient moisture retention and thermoplasticity to permit the unusually long stand or assembly time prior to hotpressing.

Lignosulfonate obtained from any source may be used. Lignin is a polymeric substance of substituted aromatics found in plant and vegetable tissue associated with cellulose and other plant constituents. While there is some variation in the chemical structure and of other constituents found in the plant, depending upon the type of plant, place where the plant is grown, and also upon the method used in recovery or isolation of the particular constituents from the plant tissue, the basic structure and properties of these materials are similar and upon sulfonation form a well-known group of materials referred to as "lignosulfonates" or "sulfonated lignin." The reaction and properties of lignosulfonates and lignin are covered in the text The Chemistry of Lignin by F. E. Brauns et al., Academic Press, New York, N.Y. (1960).

One of the main sources of sulfonated lignin is the residual pulping liquors obtained in the pulp and paper industry where lignocellulosic materials such as wood, straw, corn stalks, bagasse and the like are processed by well-known methods to recover the cellulose or pulp. In the sulfite pulping process, the lignocellulose is digested with a sulfite or bisulfite to sulfonate the lignin and obtain a residual pulping liquor commonly referred to as "spent sulfite liquor" containing the sulfonated lignin. In other processes, the residual pulping liquor or the lignin as obtained from the process may not be a sulfonated product. However, the residual liquors or products containing the lignin portion may be sulfonated by the various known methods to the degree desired by the reaction, for example, with a bisulfite or sulfite, including further sulfonation of the spent sulfite liquor. Residual pulping liquors obtained in the kraft or other alkaline processes in the digestion of lignocellulosic materials, "hydrolysis lignin" obtained by hydrolysis of lignocellulosic materials in manufacture of wood sugars may thus be sulfonated to form lignosulfonate which may be used in preparation of the polymerized lignosulfonate or insolubilized lignosulfonate.

In addition to using the lignosulfonates as obtained in the residual pulping liquors, the lignosulfonate polymerized may be a particular molecular weight fraction or a residual pulping or other liquor which has been subjected to different treatments, such as for example acid treatment, alkaline or heat treatments, oxidation or fermentation to remove or modify some of the nonlignin constituents or for other purposes. Generally, the basic phenylpropane polymeric structure of the lignin constituents and properties and characteristics of these products are not destroyed unless the treatment is unusually severe. For example, a vanillin raffinate obtained by oxidation of a spent sulfite liquor in preparation of vanillin may consist mainly of degradation products but may still contain sufficient amounts of low molecular weight oxidized lignosulfonates which may be condensed to the degree desired under more severe condensation conditions. Lignosulfonates or the lignosulfonate-containing liquors can be oxidized to a lesser extent than in preparation of vanillin, by enzymatic oxidation as disclosed in U.S. Pat. No. 3,212,966, by electrolysis or by chemical oxidation using oxidizing agents such as halogens, chlorine dioxide, oxygen, ozone, peroxide, hypochlorites, metal oxides such as chromium trioxide and other oxidizing agents such as nitric acid and dichromates. Further, the treated and nontreated products can also be fractionated.

The lignosulfonates may be polymerized to the desired extent by reacting the lignosulfonate product with an aldehyde, an epoxy, or other crosslinking agents by the various known methods. Relatively short chain crosslinking agents are preferably used to minimize the modification of the characteristics of the lignosulfonate by the agent. Agents having from 1 to 3 carbon atoms are preferred. Aldehydes having up to 6 carbon atoms, such as formaldehyde, acetaldehyde and heterocyclic aldehydes such as furfural and hydroxymethylfurfural may be employed. Epihalohydrins such as epichlorohydrin or epibromohydrin and di- and poly-epoxides having not more than 10 carbon atoms, such as diglycidyl ether, 1, 4 butanediol diglycidyl ether, butadiene dioxide, dimethylpentane dioxide, diepoxyoctane, vinyl cyclohexene dioxide, ethylene glycol bis-epoxypropyl ether, 1,4 butanediol bis-epoxypropyl ether, and others may also be used. The reaction may be carried out under acid or alkaline conditions. Generally a product which is prepared under alkaline conditions will have improved stability in alkaline adhesives, and a product which has been prepared utilizing an acid catalyst will have improved stability in acid adhesives.

In the polymerization of the lignosulfonate, generally the lignosulfonate is reacted with a sufficient amount of the cross-linking agent to obtain the desired degree of polymerization. Usually only a relatively small amount of the cross-linking agent is required. The cross-linking reaction may be carried out in a solvent using processes similar to that described for reaction of lignin with epoxide in U.S. Pat. No. 3,149,085 or in the Pat. application of William Scott Briggs, Ser. No. 305,821 filed Nov. 13, 1973 now U.S. Pat. No. 3,857,830. The polymerization with an aldehyde is usually carried out in an aqueous medium with formaldehyde being the preferred cross-linking agent. With formaldehyde, the desired degree of polymerization may be obtained by reacting lignosulfonate solutions of from 25 to 50 percent concentration with from 5 to 10 weight percent of formaldehyde at temperatures of from 50° to 150°C. Preferably the reaction may be carried out under atmospheric pressure at a temperature of 95° or so. Generally less than 10 percent of formaldehyde will react with a lignosulfonate under these conditions, even though larger amounts may be added. Temperatures in the range of 110° to 130°C may be conveniently employed for acetaldehyde and heterocyclic aldehydes used in molar amounts equivalent to that of formaldehyde.

In addition to effecting the polymerization of lignosulfonate in a solvent, the lignosulfonate may be polymerized in a dry state by the reaction of lignosulfonate with paraformaldehyde in a closed container or heating of lignosulfonate in a fluidized bed in the presence of an aldehyde or halohydrin such as formaldehyde or epichlorohydrin in a gaseous state. While the spent sulfite liquor may be cross-linked or polymerized as the base obtained from the pulping, it is generally preferred to convert magnesium or calcium base liquors to sodium, potassium, or ammonium salt form or mixtures thereof prior to use. With ammonium base spent sulfite liquor, less cross-linking agent may be required to obtain a product having the desired solubility characteristics. Some interaction or condensation of lignin with the ammonium ions is obtained decreasing the amount of cross-linking agent necessary.

The cross-linking or polymerization is carried out to the extent that from 30 to 80 percent of the polymerized product is insoluble in a 5 weight percent sodium carbonate solution. The solubility of the product in the alkaline medium is somewhat greater than in water. Usually, reaction mixtures or products obtained upon polymerization of lignosulfonate products are used without purification. Some of these products such as a spent sulfite liquor, may contain 25 percent or more of soluble inorganic salts and sugars which will give a high solubility reading if not taken into consideration. The insolubles obtained are generally gels which swell to a greater extent after an alkaline treatment than if just contacted with water. For example, the insolubles obtained upon contacting a polymerized product with a 5 percent sodium carbonate solution and washing with water will have a swelling in the range of about 15 to 70 grams of gel per gram of dry insolubles, depending upon the cross-linking agent and extent of polymerization. The same product when contacted with water will have a greater insoluble portion or residue with an appreciably lower swelling. Contacting this residue with a 5 percent sodium carbonate solution will dissolve a portion of the residue and increase the swelling to an extent similar to that obtained above with the sodium carbonate treatment. Apparently, when the polymerized lignosulfonate is intermixed with the phenol-aldehyde resin, an insoluble finely dispersed gel is obtained which upon application to plywood veneer will control the penetration and also provide sufficient body and thermoplasticity to the adhesive to permit good bonds to be formed upon hotpressing after a stand or assembly time of 40 or more hours.

The polymerized lignosulfonate or sulfite liquor is preferably intermixed with phenol and aldehyde during condensation of the phenol with aldehyde in preparation of the resin or added to the phenol-aldehyde resin at the end of the resin preparation. The addition of the polymerized lignosulfonate during the resin preparation subjects the polymerized product to the conditions of the resin or adhesive preparation, swelling the insolubles and otherwise conditioning the polymerized product to the environment of the resin or adhesive. The polymerized product, all or a portion, may also be added to the adhesive or resin prior to use. It may be intermixed for sufficient time with the adhesive or resin to have the product swell and stabilize, or the product may be contacted with an alkali solution, such as sodium carbonate or alkali metal hydroxide, to swell or condition the product prior to addition, for example, to an alkaline adhesive. The viscosity of the mixture increases with the swelling of the polymerized product so that allowances for changes in viscosity have to be made to obtain an adhesive of the proper viscosity when the conditioning of the added polymerized lignosulfonate is substantially completed. With the addition of the polymerized product during the condensation of the phenol with the aldehyde, the conditioning of the polymerized lignin is completed by the time the desired condensation between the phenol and the aldehyde has been obtained. Thus, the condensation is carried out to the extent necessary to obtain a product of a desired viscosity which will not be changing due to further swelling of the polymerized insolubles. The same methods or procedures presently used for the condensation of phenol with aldehyde in preparation of resins for plywood adhesives are employed, when the polymerized lignosulfonate is added during the resin preparation. From 1 to 3 equivalents of aldehyde per mole equivalent of phenol are generally used with a ratio of 1.6 to 2.5 moles of formaldehyde per mol of phenol being preferred. The mixture is heated usually under alkaline conditions until sufficient condensation has been obtained to obtain the desired viscosity, generally being in the range of 250 to 5,000 centipoises depending upon the use to be made of the adhesive. The condensation is preferably carried out with periodic additions of caustic as commonly used in preparation of plywood adhesive resins.

While the adhesive containing only the resin and the polymerized lignosulfonate may be used without any additional modifiers or extenders, additives normally added to plywood adhesives such as amylaceous materials, fillers, hardening agents and others may be added to prepare adhesives of the type conventionally employed at present in plywood manufacture. However, this is not necessary and the adhesive containing only the resin and polymerized lignosulfonate may be used by itself in the various conventional processes for plywood preparation. The viscosity of the final mixture upon condensation of the phenol with the aldehyde as such is not critical but is generally controlled for optimum effectiveness of the adhesive for the particular condition under which it is to be used. For example, an adhesive having a different viscosity would be desired for application by spray than for application with a mechanical spreader. Also, a higher viscosity adhesive would be desirable for the more porous veneer such as southern pine than for Douglas Fir. Further, if modifiers or extenders are to be added, such as for example starch and other agents which will increase the viscosity, the viscosity of the resin with the polymerized lignosulfonate would be maintained at a lower level to take into account the increase in viscosity which may be obtained by the addition of the filler or additive.

Generally a sufficient amount of the polymerized lignosulfonate is added to improve the assembly time and other properties of the adhesive. An amount in the range of 2 to 25 weight percent of the weight of the phenol and aldehyde in the adhesive is usually used with 10 to 15 percent being preferred. Where optimum strengths are not required, the polymerized product may also be used as a filler or extender using amounts up to 50 percent or more. The addition of the polymerized lignosulfonate will also give good bonds upon hotpressing shortly after assembly of the panels as well as imparting the desired properties to the adhesive to be able to form a strong bond after exceptionally long stand time after lay-up.

In use of the adhesive, the various known methods and procedures used in plywood or chipboard preparation may be employed. The amount spread, the temperature of heatset, pressures employed and other conditions are within the conditions presently used with the variations normally encountered and obvious to those skilled in the art.

While the resins used in the preparation of adhesives for plywood are generally phenol-formaldehyde resins, the polymerized lignosulfonate may also be used with other phenol-aldehyde resins such as those described in U.S. Pat. Nos. 3,360,376; 2,437,981; or No. 2,457,493.

The following examples further illustrate the invention:

EXAMPLE I

A fermented calcium base spent sulfite liquor was alkaline treated by addition of about 9 percent sodium hydroxide based on liquor solids and heating for 20 hours in a boiling water bath. After the treatment, the alkaline treated liquor had a pH of 10. The alkaline treated material was diluted until it contained about 40 percent solids and then condensed with 10 percent formaldehyde, based upon the alkaline treated solids. The condensation was carried out by heating the mixture in a vessel for 2 ½ hours placed in an 130°C oven. After condensation, the resulting gel was tray dried at 130°C and ground to pass through 100 mesh screen. 37 percent of the total product was insoluble in 5% sodium carbonate solution which if based upon the lignosulfonate content would represent an insolubility of about 50 percent. The swelling of the insolubles after washing with water was 50 grams wet gel per gram of insolubles.

In the determination of the amount of insolubles and the swelling of the insolubles, 0.5 gram of the product ground to pass through a 100 mesh screen was added to 45 milliliters of 5 percent sodium carbonate solution and the mixture heated in a boiling water bath for 30 minutes with the mixture being mixed periodically. The resulting mixture was then centrifuged and the solution decanted from the residue or gel. The residue was then washed four times by adding distilled water to the gel, in an amount about equal to the solution decanted, mixing and centrifuging the mixture to separate the insolubles from the wash water for each washing. After the last washing, centrifugation, and decantation the wet gel was weighed. After weighing, the gel was dried for 16 hours at 105°C. The dried residue was weighed and then used for determination of the insolubility of the product in the sodium carbonate solution and the swelling of the insolubles. The swelling of the insoluble constituents as expressed is the ratio of the weight of the wet insolubles or gel to the dry weight of the insolubles and was obtained by dividing the dry weight of the insoluble constituents into the wet weight of the gel or insoluble constituents obtained after the last washing and decantation.

The above product was used in the preparation of a phenol-formaldehyde adhesive used for plywood preparation. The product was added to a mixture of phenol and formaldehyde during the preparation of phenol-formaldehyde resin to be used as an adhesive. The polymerized lignosulfonate was added in an amount of about 12 percent of the weight of the phenol and formaldehyde used in preparation of the adhesive. The mixture was heated under alkaline conditions until a viscosity of about 1500 centipoises (25°C) was obtained. The resin thus obtained was used in the preparation of 5-ply ½ inch plywood test panels from Douglas Fir veneer containing about 2 percent moisture. The adhesive containing about 40 percent solids was applied by spray in the amount of about 78 pounds per thousand square feet of double glue line. After spraying and lay-up, the panels were allowed to stand 10 minutes before prepressing five minutes at 150 psi. The prepressed panels were then allowed to stand for periods up to about 24 hours before hotpressing for 6 ¼ minutes at 175 psi and 285°F. Wood failure tests of the panels were carried out by the A.P.A. vacuum-pressure test for exterior plywood. The assembly time or the time from lay-up to hot-pressing and the wood failures are shown in the table below:

| Assembly Time, Hours | % Wood Failure |
| --- | --- |
| ½ | 89 |
| 2 | 72 |
| 6 | 93 |
| 24 | 87 |

EXAMPLE II

A concentrated fermented calcium base liquor was converted to a sodium base by the simultaneous addition of sulfuric acid and sodium hydroxide in the proportion of 1:2 on a molar basis to precipitate the calcium as calcium sulfate which was removed by centrifuging. The sodium base spent sulfite liquor was alkaline treated by addition of about 4 percent by weight of sodium hydroxide based on liquor solids and heating the mixture for 12 hours at a temperature of 95°C. After the heat treatment, the mixture had a pH of about 10. The mixture was diluted with water to a concentration of about 40 percent solids after which formaldehyde was added in an amount of 7 percent of the solids in the alkaline treated spent sulfite liquor. The formaldehyde containing liquor was heated at a temperature of about 95° for about 17 ½ hours in which time the product gelled. The material was then dried in a ribbon blender at a temperature of from 135° to 160°C. After drying, the material was ball milled so that 99 percent of the material could pass through a 100 mesh screen. The ground material had an insolubility of 43 percent in a 5 percent sodium carbonate solution. The swelling of the insolubles after washing with water was 48 expressed as the ratio of the weight of the wet insolubles to the dry weight of the insolubles.

The above polymerized lignosulfonate was used in preparation of adhesives used for plywood manufacture. The polymerized product was added to a mixture of phenol and formaldehyde in an amount to represent about 10 percent of the weight of the phenol and formaldehyde used in the resin preparation. The phenol and formaldehyde were reacted in the formation of the resin using the normal procedures for reacting the phenol with the formaldehyde with periodic additions of caustic. After preparation, the resin was tested as an adhesive for exterior grade plywood. Douglas Fir veneer containing about 2 percent moisture was used in preparation of 5-ply ½ inch plywood. The adhesive was applied by spray in an amount of about 78 pounds per 1000 square feet of double glue line and after the assembly the panels were allowed to stand for 15 to 30 minutes before pre-pressing for one minute at 175 pounds per square inch. The pre-pressed panels were then allowed to stand for different periods of time prior to hot-pressing for 6 ¼ minutes at 175 pounds per square inch and 285°F. Wood failure tests of the panels were evaluated using the American Plywood Association Vacuum-Pressure Test procedure for exterior plywood. The assembly times, from lay-up to hot-pressing, and the wood failures obtained are shown in the table below:

| Assembly Time, Hours | % Wood Failure |
| --- | --- |
| ½ | 100 |
| 2 | 100 |
| 6 | 94 |
| 24 | 87 |

EXAMPLE III

A fermented calcium base liquor was converted to the sodium base by addition of sodium sulfate to precipitate calcium as calcium sulfate. After removal of the calcium sulfate, the spent sulfite liquor was alkaline treated in a manner similar to that described in Example II and then reacted with about 6.6 percent formaldehyde. The reaction with the formaldehyde was carried out in two steps by prereacting the alkaline treated spent sulfite liquor with about 1.6 percent formaldehyde prior to the addition of the remainder of the formaldehyde. The reaction was carried out at about 95°C until the product gelled after which the product was tray dried at 105°C and ground. The product had a 44 percent insolubility in a 5 percent sodium carbonate solution and a swelling of the insolubles after washing with water was 51 grams of gelled insolubles per gram of dried solubles.

The above polymerized lignosulfonate was added in amount of about 12 weight percent to a mixture of phenol and formaldehyde and reacted in the preparation of a resin to be used as an adhesive in plywood preparation. The mixture was reacted with periodic additions of caustic until the desired viscosity was obtained. After preparation, the resin containing the polymerized lignosulfonate was tested as an adhesive for exterior grade plywood. Panels of 5-ply 1 ½ inch plywood were prepared using Douglas Fir veneer and the adhesive was applied in an amount of about 72 pounds per 1000 square feet of double glue line. After assembly the panels were permitted to stand for various periods of time and then hotpressed at 288°F at 175 pounds per square inch pressure. Some panels were also hotpressed for 5 ¾ and 5 ¼ minutes after 90 minutes after lay-up. Specimens cut from these panels were evaluated by determining the wood failures obtained with the adhesive using the American Plywood Association Vacuum-Pressure test procedure for exterior plywood. The assembly time, which is the time from lay-up to hotpressing, and other data are shown in the table below:

| Assembly Time, Hours | Hotpressing Time, Minutes | % Wood Failure |
|---|---|---|
| ½ | 6¼ | 98 |
| 2 | 6¼ | 98 |
| 24 | 6¼ | 97 |
| 44 | 6¼ | 94 |
| 1½ | 5¾ | 96 |
| 1½ | 5¼ | 95 |

EXAMPLE IV

A fermented spent sulfite liquor was converted to the sodium base form by the addition of sodium hydroxide and sulfuric acid and then subjected to an alkaline treatment with about 9 percent sodium hydroxide at 95°C for about 16 hours. The alkaline treated liquor at a concentration of about 46 percent solids was polymerized using about 10 percent, based upon the solids content of the alkaline treated liquor, of butanediol diglycidyl ether.

To 750 grams of the alkaline treated spent sulfite liquor, 34 grams of butanediol diglycidyl ether were added and after being intermixed, the mixture was placed in an 80° water bath. The reaction mixture was periodically mixed until it gelled, in about 1 hour, and then heating was continued for 6 hours. The gel was tray dried at about 125°C and then ground to pass a 100 mesh screen. About 43 percent of the ground product was insoluble in the 5 percent sodium carbonate solution as determined by the method described in Example I. The swelling of the insolubles after washing with water was about 24 grams of gel per gram of the dry insolubles.

The butanediol diglycidyl ether polymerized lignosulfonate was used in the preparation of phenol formaldehyde resin used for plywood preparation. The polymerized lignosulfonate was added in an amount of about 12 percent of the weight of phenol and formaldehyde and the mixture was condensed under alkaline conditions until a viscosity of about 1260 centipoises was obtained.

The prepared phenol-formaldehyde resin was used as an adhesive in the preparation of 5-ply ½ inch plywood test panels from Douglas fir veneer in a manner similar to that described above. The adhesive was applied in an amount of 78 lbs. per 1000 square feet of double glue line as a 40 percent solids mixture. After laying up the panels, the panels were allowed to set for 10 minutes before pre-pressing for 5 minutes at 150 lbs. psi. The pre-pressed panels were then allowed to stand for a period of time up to 24 hours before hotpressing and testing in a manner described above. The assembly time which is the time from lay-up to hotpressing and wood failures obtained are shown in the Table below.

| Assembly Time, Hours | % Wood Failure |
|---|---|
| ½ | 98 |
| 6 | 96 |
| 24 | 98 |

EXAMPLE V

The alkaline treated spent sulfite liquor of Example IV was also polymerized with epichlorohydrin.

To 750 milliliters of the alkaline treated solution, 15 percent sodium hydroxide and 25 percent epichlorohydrin, based upon the alkaline treated spent sulfite liquor solids, were added and the mixture placed in a 40°C water bath. The mixture gelled in about 50 minutes after which the temperature of the water bath was increased to 80°C and allowed to remain overnight. The product was dried in a 125°C oven for about 20 hours. The dried polymerized lignosulfonate was then ground to minus 100 mesh. About 41 percent of the product was insoluble in a 5 percent sodium carbonate solution tested in the manner described above. The swelling of the insolubles after washing with water was 14 grams per gram of dry solids.

The ground epichlorohydrin polymerized lignosulfonate was used in the preparation of plywood adhesives by addition to a mixture of phenol and formaldehyde in preparation of an adhesive in a manner similar to that described above. The adhesive was condensed until a viscosity of about 1030 centipoises was obtained which was then used in the preparation of test panels and tested as a plywood adhesive as described above. The results obtained are shown in the Table below.

| Assembly Time, Hours | % Wood Failure |
|---|---|
| ½ | 83 |
| 2 | 94 |
| 6 | 100 |
| 24 | 96 |

What is claimed is:

1. A thermosetting phenol-aldehyde adhesive composition comprising a water-soluble phenol-aldehyde resin intermixed with a polymerized lignosulfonate in an amount sufficient to improve the assembly time of the adhesive, said polymerized lignosulfonate being a lignosulfonate reacted with a sufficient amount of a cross-linking agent selected from the group consisting essentially of aliphatic and heterocyclic aldehydes having up to 6 carbon atoms, epichlorohydrin, epibromohydrin, and poly-epoxides having not more than 10 carbon atoms to polymerize the lignosulfonate to the extent that from 30 to 80 percent of the polymerized lignosulfonate is insoluble in a 5 percent sodium carbonate aqueous solution.

2. A composition of claim 1 wherein the lignosulfonate is polymerized to the extent that from 45 to 65 percent of the product is insoluble and is added in an amount of from 2 to 25 percent of the weight of the phenol and aldehyde used.

3. A composition according to claim 1 wherein the adhesive is a plywood adhesive of phenol-formaldehyde resin condensed under alkaline conditions.

4. A composition according to claim 3 wherein the lignosulfonate is polymerized to the extent that from 45 to 65 percent of the product is insoluble.

5. A composition according to claim 4 wherein the cross-linking agent is an aldehyde.

6. A composition according to claim 5 wherein the aldehyde is formaldehyde.

7. A composition according to claim 4 wherein the cross-linking agent is epichlorohydrin.

8. A composition according to claim 4 wherein the cross-linking agent is a polyepoxide having no more than 10 carbon atoms.

9. A composition according to claim 8 wherein the polyepoxide is a butanediol diglycidyl ether.

10. A process for the preparation of a thermosetting adhesive composition of phenol-aldehyde resin which comprises, intermixing phenol and an aldehyde with a polymerized lignosulfonate in an amount of from 2 to 25 weight percent of the phenol and aldehyde, and heating the mixture to condense the phenol with the aldehyde, said polymerized lignosulfonate being a lignosulfonate reacted with a sufficient amount of a cross-linking agent selected from the group consisting essentially of aliphatic and heterocyclic aldehydes having up to 6 carbon atoms, epichlorohydrin, epibromohydrin, and polyepoxides having not more than 10 carbon atoms to polymerize the lignosulfonate to the extent that from 30 to 80% of the polymerized lignosulfonate is insoluble in a 5% carbonate aqueous solution.

11. A process according to claim 10 wherein the phenol and the aldehyde are phenol and formaldehyde intermixed in a mole ratio of phenol to formaldehyde of 1:1.6 to 1:2.5 and condensed under alkaline conditions.

12. A process according to claim 11 wherein a lignosulfonate is polymerized with formaldehyde until from 45 to 65 percent of the polymerized product is insoluble.

13. A process according to claim 12 wherein the polymerized lignosulfonate is a polymerized spent sulfite liquor and is added in an amount from 10 to 20 weight percent of the phenol and formaldehyde.

14. In a process for the lamination of plys of veneer in a manufactured plywood, the improvement of using as an adhesive the composition of claim 1.

15. In a process for lamination of plys for veneer in manufacture of plywood, the improvement of using as an adhesive the composition of claim 3.

16. In a process for lamination of plys for veneer in the manufacture of plywood the improvement of using as an adhesive the composition prepared by the process of claim 13.

17. A laminate prepared by claim 14.
18. A laminate prepared by claim 15.
19. A laminate prepared by claim 16.

* * * * *